(12) United States Patent
Dange et al.

(10) Patent No.: US 12,501,362 B2
(45) Date of Patent: Dec. 16, 2025

(54) METHOD AND SYSTEM FOR POWER MANAGEMENT BY A USER EQUIPMENT

(71) Applicant: SAMSUNG ELECTRONICS CO., LTD., Suwon-si (KR)

(72) Inventors: Amit Anandrao Dange, Bangalore (IN); Kailash Kumar Jha, Bangalore (IN); Aman Agarwal, Bangalore (IN); Siddharth Shukla, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 377 days.

(21) Appl. No.: 18/113,890

(22) Filed: Feb. 24, 2023

(65) Prior Publication Data
US 2024/0196326 A1 Jun. 13, 2024

Related U.S. Application Data

(63) Continuation of application No. PCT/KR2023/002115, filed on Feb. 14, 2023.

(30) Foreign Application Priority Data

Dec. 12, 2022 (IN) .............................. 202241071746

(51) Int. Cl.
*H04W 52/02* (2009.01)

(52) U.S. Cl.
CPC .............................. *H04W 52/0225* (2013.01)

(58) Field of Classification Search
CPC . H04W 64/006; H04W 8/02; H04W 36/0085; H04W 36/322; H04W 48/20; H04W 48/16; H04W 36/0088
See application file for complete search history.

(56) References Cited

U.S. PATENT DOCUMENTS

| | | |
|---|---|---|
| 2014/0038579 A1 | 2/2014 | Henttonen et al. |
| 2017/0347327 A1 | 11/2017 | Rahman et al. |
| 2018/0098280 A1 | 4/2018 | Choi et al. |
| 2020/0107228 A1 | 4/2020 | Wang et al. |

(Continued)

FOREIGN PATENT DOCUMENTS

| | | |
|---|---|---|
| CN | 111512583 | 8/2020 |
| EP | 2395785 | 12/2013 |

(Continued)

OTHER PUBLICATIONS

Technical Specification, 3GPP TS 38.306 v15.2.0, User Equipment (UE) radio access capabilities, Sep. 2018, 31 pages.

(Continued)

*Primary Examiner* — Marisol Figueroa
(74) *Attorney, Agent, or Firm* — Nixon & Vanderhye P.C.

(57) ABSTRACT

The present disclosure relates to a method and apparatus for power management by a user equipment (UE). The method comprises: determining whether at least one of a plurality of modes has been triggered at the UE; determining an optimized scaling factor by the UE based on at least one of a plurality of parameters associated with an operating condition of the UE, upon determining that the at least one of the plurality of modes has been triggered; and transmitting the optimized scaling factor to a network, wherein the optimized scaling factor indicates that less network resources are required.

18 Claims, 14 Drawing Sheets

(56) References Cited

U.S. PATENT DOCUMENTS

| | | |
|---|---|---|
| 2020/0229270 A1 | 7/2020 | Chatterjee et al. |
| 2020/0236634 A1 | 7/2020 | Sridharan et al. |
| 2020/0329507 A1 | 10/2020 | Tang |
| 2021/0314804 A1 | 10/2021 | Gao |
| 2022/0022064 A1 | 1/2022 | Raghavan et al. |
| 2022/0271874 A1 | 8/2022 | Behravan et al. |
| 2022/0322240 A1 | 10/2022 | Zhu |
| 2023/0142271 A1 | 5/2023 | Huang |
| 2024/0214942 A1 | 6/2024 | Wang et al. |

FOREIGN PATENT DOCUMENTS

| | | | |
|---|---|---|---|
| WO | WO-2011123744 A1 * | 10/2011 | ............ H04W 24/10 |
| WO | 2019/219068 | 11/2019 | |
| WO | 2021/227017 | 11/2021 | |
| WO | 2024/060095 | 3/2024 | |

OTHER PUBLICATIONS

Technical Specification, 3GPP TS 38/306 V15.4.0 User Equipment (UE) radio access capabilities, Apr. 2019, 44 pages.
Search Report and Written Opinion dated Sep. 11, 2023 issued in International Patent Application No. PCT/KR2023/002115.

* cited by examiner

METHOD AND SYSTEM FOR POWER MANAGEMENT BY A USER EQUIPMENT

CROSS-REFERENCE TO RELATED APPLICATIONS

This application is a continuation of International Application No. PCT/KR2023/002115 designating the United States, filed on Feb. 14, 2023, in the Korean Intellectual Property Receiving Office and claiming priority to Indian Patent Application No. 202241071746 filed on Dec. 12, 2022, in the Indian Patent Office, the disclosures of each of which are incorporated by reference herein in their entireties.

BACKGROUND

Field

The disclosure relates to apparatus and method for power management by a user equipment (UE).

Description of Related Art 5G networks aim to boost digital transformation by providing faster connectivity speeds, ultra-low latency, and greater bandwidth. With features like higher modulation, carrier aggregation, massive Multiple-Input Multiple-Output (MIMO) and dual connectivity, a user equipment (UE) is able to utilize resources from multiple cells with same or different Radio Access Technology (RAT) to improve data throughput performance of the UE. But not all situations require high data speeds and maximum bandwidth support while the UE is camped on a 5G cell. Depending on the situation, the UE can manage with comparatively lower data speed and lower resource allocation. If the UE can manage with less resources based on the demand/requirement of the scenario, it leads to better power optimization in the UE because transmission power for the UE would be reduced as lower resources would require lower transmission (TX) power.

Similarly, if the UE can reduce modulation scheme used, it also leads to better power optimization and save transmission power for the UE as higher modulation requires higher TX power.

An Information Element (IE) referred to as a "Scaling Factor" was introduced in the 3GPP Standards TS 38.306 v15.1.0 onwards to reflect association of maximum number of layers and maximum modulation order with the band combination where UE can indicate/report different scaling factor to the network based on UE supported capability (such as baseband processing capability/radio frequency (RF) or hardware limitations etc.) for maximum data rate calculation. The network, in return, allocates resources (such as number of layers/modulation schemes) based on the scaling factor indicated by the UE.

Hence, based on UE supported capabilities, the network allocates maximum available resources with higher modulation and MIMO for UE to achieve maximum throughput (TPUT) possible at that time. However, higher modulation schemes and higher MIMO (e.g., with a greater number of layers) require higher transmission (TX) power from the UE and lead to high battery/power consumption.

Also, not all situations (such as disaster or emergency situations or when UE's battery is low or when power saving is enabled or when UE is heated up etc.) require high data speeds and maximum bandwidth support while the UE is camped on a 5G cell. Depending on the situation, the UE can manage with comparatively lower data speed and lower resource allocations. It is required to save as much power as possible whenever convenient to provide good user experience and make sure the UE can save battery and remain powered up as long as possible.

However, currently, UE reports the scaling factor as 1 whenever the maximum capability of the UE is available and there is no way for the UE to report to the network to allocate a comparatively lower resources (with lower modulation schemes and/or lower MIMO capability with less number of layers) with a lower scaling factor in some crunch situations (where high data speeds/more resources are not needed and battery could be saved with lower speeds/less resources) whenever maximum UE capability is available.

This leads to unnecessary high power consumption in those crunch situations and leads to poor battery/power performance and provide bad user experience.

Hence, there is a need in the art for a technique which overcomes the above discussed problems.

SUMMARY

In an example embodiment, the present disclosure discloses a method for power management by a user equipment (UE). The method comprises: determining whether at least one of a plurality of modes has been triggered at the UE; determining an optimized scaling factor by the UE based on at least one of a plurality of parameters associated with an operating condition of the UE, upon determining that the at least one of the plurality of modes has been triggered; and transmitting the optimized scaling factor to a network, wherein the optimized scaling factor indicates that less network resources are required.

In an example embodiment, a UE for power management is disclosed. The UE comprises: a memory and a processor coupled to the memory. The processor is configured to: determine whether at least one of a plurality of modes has been triggered at the UE; determine an optimized scaling factor by the UE based on at least one of a plurality of parameters associated with an operating condition of the UE, upon determining that the at least one of the plurality of modes has been triggered; and transmit the optimized scaling factor to a network, wherein the optimized scaling factor indicates that less network resources are required.

In an example embodiment, a non-transitory computer-readable storage medium storing instructions is disclosed. The instructions, when executed by a processor of a UE, cause the UE to perform operations. The operations comprise determining whether at least one of a plurality of modes has been triggered at the UE; determining an optimized scaling factor based on at least one of a plurality of parameters associated with an operating condition of the UE, upon determining that the at least one of the plurality of modes has been triggered; and transmitting the optimized scaling factor to a network, wherein the optimized scaling factor indicates that less network resources are required.

To further illustrate various example advantages and features of the present disclosure, a more detailed description will be rendered with reference to various example embodiments thereof, which are illustrated in the appended drawings. It will be appreciated that these drawings merely depict example embodiments of the disclosure and are therefore not to be considered limiting its scope. The disclosure will be described and explained with additional specificity and detail with the accompanying drawings.

BRIEF DESCRIPTION OF THE DRAWINGS

These and other features, aspects, features and advantages of certain embodiments of the present disclosure will be more apparent from the following detailed description, taken in conjunction with the accompanying drawings in which like characters represent like parts throughout the drawings, and in which.

Figure 1:
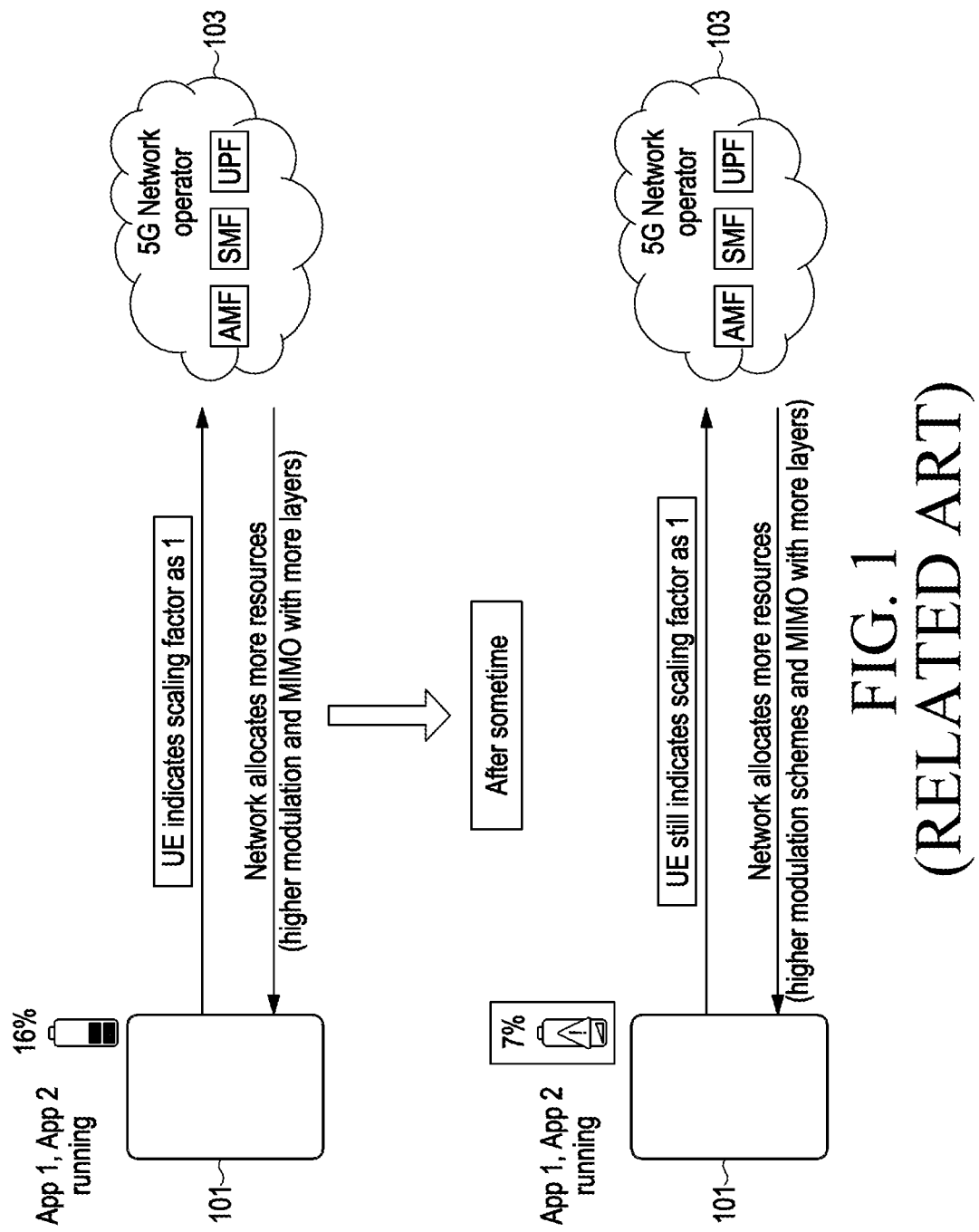
FIG. 1 is a diagram illustrating allocation of network resources when battery of UE is low, in accordance with existing art.

Further, skilled artisans will appreciate that elements in the drawings are illustrated for simplicity and may not have been necessarily drawn to scale. For example, the flowcharts illustrate the method in terms of operations involved to help to improve understanding of aspects of the present disclosure. Furthermore, in terms of the construction of the UE, one or more components of the UE may have been represented in the drawings by conventional symbols, and the drawings may simply show those specific details that are pertinent to understanding the various example embodiments of the present disclosure so as not to obscure the drawings with details that will be readily apparent to those of ordinary skill in the art having the benefit of the description herein.

DETAILED DESCRIPTION

For the purpose of promoting an understanding of the principles of the disclosure, reference will now be made to various example embodiments illustrated in the drawings and specific language will be used to describe the same. It will nevertheless be understood that no limitation of the scope of the disclosure is thereby intended, such alterations and further modifications in the illustrated system, and such further applications of the principles of the disclosure as illustrated therein being contemplated as would normally occur to one skilled in the art to which the disclosure relates.

It will be understood by those skilled in the art that the foregoing general description and the following detailed description are not intended to be restrictive thereof.

Reference throughout this disclosure to "an aspect", "another aspect" or similar language may refer, for example, to a particular feature, structure, or characteristic described in connection with an embodiment being included in at least one embodiment of the present disclosure. Thus, appearances of the phrase "in an embodiment", "in another embodiment" and similar language throughout this disclosure may, but do not necessarily, all refer to the same embodiment.

The terms "comprises", "comprising", or any other variations thereof, are intended to cover a non-exclusive inclusion, such that a process or method that comprises a list of steps does not include only those operations but may include other steps not expressly listed or inherent to such process or method. Similarly, one or more systems or sub-systems or elements or structures or components proceeded by "comprises . . . a" does not, without more constraints, preclude the existence of other systems or other sub-systems or other elements or other structures or other components or additional systems or additional sub-systems or additional elements or additional structures or additional components.

5G technology is introduced to provide a user with higher multi-Gbps peak data speeds, ultra-low latency, more reliability, massive network capacity, increased availability, and a more uniform user experience to more users. In 5G, a network can allocate resources (such as number of layers/modulation schemes) to the UE based on a scaling factor indicated by the UE. However, UE reports the scaling factor as 1 whenever the maximum capability of the UE is available and there is no way for the UE to report to the network to allocate a comparatively lower resources (with lower Modulation Schemes and/or lower MIMO capability with less number of layers) with a lower Scaling Factor in some crunch situations (where high data speeds/more resources are not needed and battery could be saved with lower speeds/less resources) whenever maximum UE capability is available. For example, as shown in FIG. 1, the UE 101 is in a crunch situation (UE's battery is low). Some Apps, e.g., App1 and App 2 are running on the UE 101. The UE 101 reports scaling factor as 1 if the maximum UE capability is available. The 5G network 103 allocates more resources (higher modulation and MIMO with more layers), if available. The 5G network may comprise of access and mobility management function (AMF), session management function (SMF), user plane function (UPF). The 5G network may comprise more or less components than shown in FIG. 1. After some time, due to higher Tx Power/resource utilization for Higher Modulation/MIMO with more layers, battery consumption is high, and the UE may soon run out of battery/power. As shown in FIG. 1, despite the battery of the UE being extra low, e.g., 7%, the UE still indicates scaling factor as 1 and accordingly, network allocates more resources (higher modulation schemes and MIMO with more layers). This leads to unnecessary high power consumption and leads to poor battery/power performance.

Figure 2:
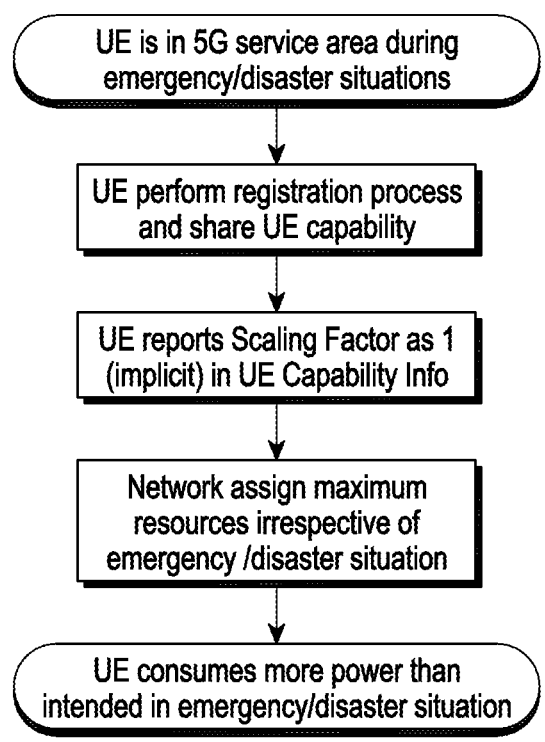
FIG. 2 is a flowchart illustrating example allocation of network resources in disaster and emergency situations, in accordance with existing art.

FIG. 2 is a flowchart illustrating allocation of network resources in disaster and emergency situations, in accordance with existing art. As shown in FIG. 2, the UE is in 5G service area and is trying to register on network for 5G services during emergency/disaster situations. The UE performs registration process on a suitable cell. During registration process, the UE shares UE capability message with "scalingFactor" in an IE as 1 (implicit) and the UE requests data service features like 256QAM & 4×4 MIMO. The network assigns/allocates the requested resources, if available, to the UE. The UE uses higher resources (higher modulation schemes or higher MIMO with more layers) which leads to more battery consumption and provide poor user experience. The resources which have been assigned in excess to the UE could have been made available to other users which is more important in emergency situation.

Figure 3:
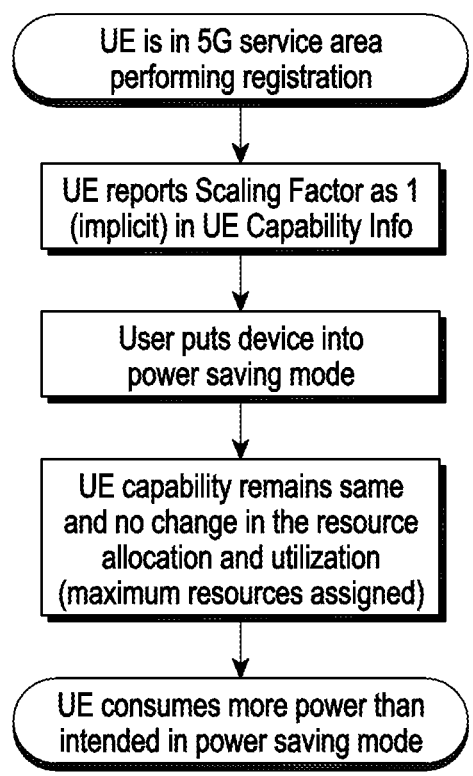
FIG. 3 is a flowchart illustrating example allocation of network resources in power saving mode, in accordance with existing art.

FIG. 3 is a flowchart illustrating allocation of network resources in power saving mode, in accordance with existing art. As shown in FIG. 3, the UE is in 5G service area and trying to register on network for 5G services. The UE performs registration process on suitable cell. After registration, a user puts the UE in power saving mode. During registration process, the UE shares UE capability message with "scalingFactor" in an IE as 1 (implicit) and the UE requests data service features like 256QAM & 4×4 MIMO. The network allocates maximum available resources (with higher modulation schemes or higher MIMO with more layers) to the UE. Power saving mode does not change UE maximum capability and does not influence network resource allocation/maximum TPUT capacity. The UE uses higher resources (higher modulation schemes or higher MIMO with more layers) which leads to more battery consumption and provide poor user experience.

Figure 4:
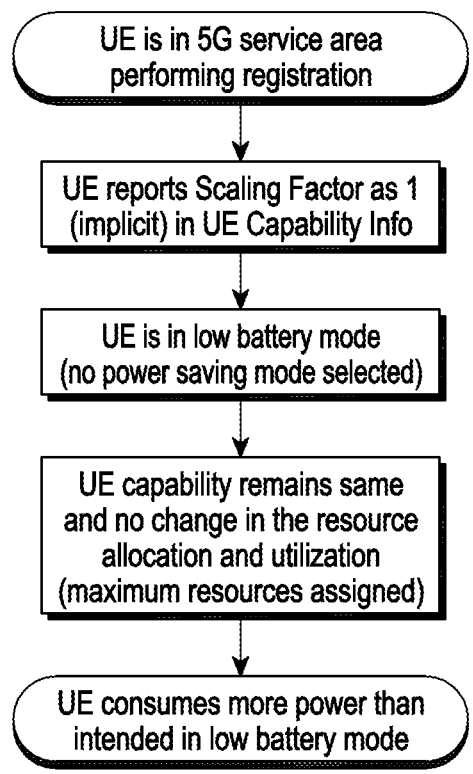
FIG. 4 is a flowchart illustrating example allocation of network resources in low battery scenario, in accordance with existing art.

FIG. 4 is a flowchart illustrating allocation of network resources in low battery scenario, in accordance with existing art. As shown in FIG. 4, the UE is in 5G service area and trying to register on network for 5G services. The UE performs registration process on suitable cell. The UE is not in power saving mode but with low battery-level. During registration process, the UE shares UE capability message with "scalingFactor" in an IE as 1 (implicit) and the UE requests data service features like 256QAM & 4×4 MIMO. The network allocates maximum available resources (with higher modulation schemes or higher MIMO with more layers) to the UE. Low battery-level in non-power saving mode does not change UE maximum capability and does not influence network resource allocation/max TPUT capacity and battery will drain at usual rate. The UE uses higher resources (higher modulation schemes or higher MIMO with more layers) which leads to more battery consumption and provide poor user experience.

Figure 5:
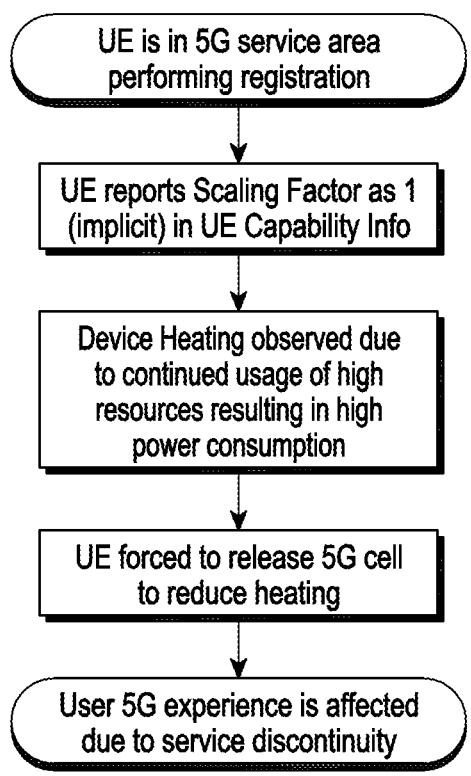
FIG. 5 is a flowchart illustrating example allocation of network resources in thermal throttling scenario, in accordance with existing art.

FIG. 5 is a flowchart illustrating allocation of network resources in thermal throttling scenario, in accordance with existing art. As shown in FIG. 5, the UE is in 5G service area and trying to register on network for 5G services. The UE performs registration process on suitable cell. During registration process, the UE shares UE capability message with "scalingFactor" in an IE as 1 (implicit) and the UE requests data service features like 256QAM & 4×4 MIMO. The network allocates maximum available resources (with higher modulation schemes or higher MIMO with more layers) to the UE. However, due to thermal throttling, the UE releases 5G cell e.g., discontinue 5G services or keep the UE in idle mode (e.g., temporarily release data connection) for some time which affects user experience. Temporary 5G services disabling or temporary data disconnection leads to poor user experience.

Figure 6:
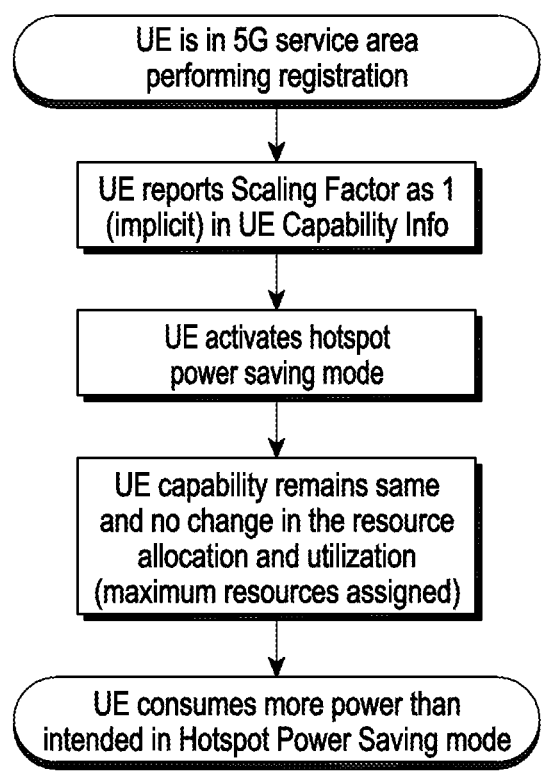
FIG. 6 is a flowchart illustrating example allocation of network resources in hotspot power saving scenario, in accordance with existing art.

FIG. 6 is a flowchart illustrating allocation of network resources in hotspot power saving scenario, in accordance with existing art. As shown in FIG. 6, the UE is in 5G service area and trying to register on network for 5G services. The UE performs registration process on suitable cell. The UE is primary hotspot UE and secondary UEs are connected to hotspot but not using any high speed data services or when hotspot keeps utilising more power unnecessarily and the UE would want to reduce power consumption. The UE activates hotspot power saving mode. During registration process, the UE shares UE capability message with "scalingFactor" in an IE as 1 (implicit) and the UE requests data service features like 256QAM & 4×4 MIMO. The network allocates maximum available resources (with higher modulation schemes or higher MIMO with more layers) to the UE. Hotspot power saving mode tries to reduce battery usage (e.g., by intermittently going to sleep when display is off and waking up when display is on). However, Hotspot power saving mode does not change UE maximum capability and does not influence network resource allocation/max TPUT capacity and battery drainage will not be optimized from data connection perspective when the UE is awake. The UE uses higher resources (higher modulation schemes or higher MIMO with more layers) whenever the UE is awake which leads to more battery consumption and provide poor user experience.

The present disclosure addresses the above mentioned problems. According to various embodiments of the present disclosure, based on situations the UE is in (such as disaster or emergency situations or when UE's battery is low or when power saving is enabled or when UE is heated up or when hotspot power saving is enabled etc), the UE computes an optimized scaling factor needed as per that situation and can decide to use a different scaling factor (optimized scaling factor) to report lower maximum throughput required from the network which will in turn reduce resources allocation by the network to the UE. As per optimized scaling factor, the network allocates limited resources and modulation & MIMO used during data activity would be lower (e.g., 64 QAM or lower and/or 2×2 or No MIMO) which is good enough to sustain ongoing services and it would result in lower power consumption for the UE. In an embodiment, the optimized scaling factor may be computed by the UE either based on pre-configured values (for example, the values can be customized/configured by the UE or the User) stored in the UE or in a universal subscriber identity module (USIM) for such situations. In an embodiment, the optimized scaling factor may be changed/optimized based on a learning model (using machine learning or any Artificial Intelligence (AI) based approach) using the data from past usage of optimized scaling factor by the UE in such situations. After the UE has returned to normal situation, the UE can report the best possible scaling factor needed as per that situation as per the UE capability and the baseband processing capability.

The disclosure explained in greater detail below with reference to FIGS. 7-13. It should be noted that the methods as described in reference to FIGS. 7-13 may be performed by the UE.

Figure 7:
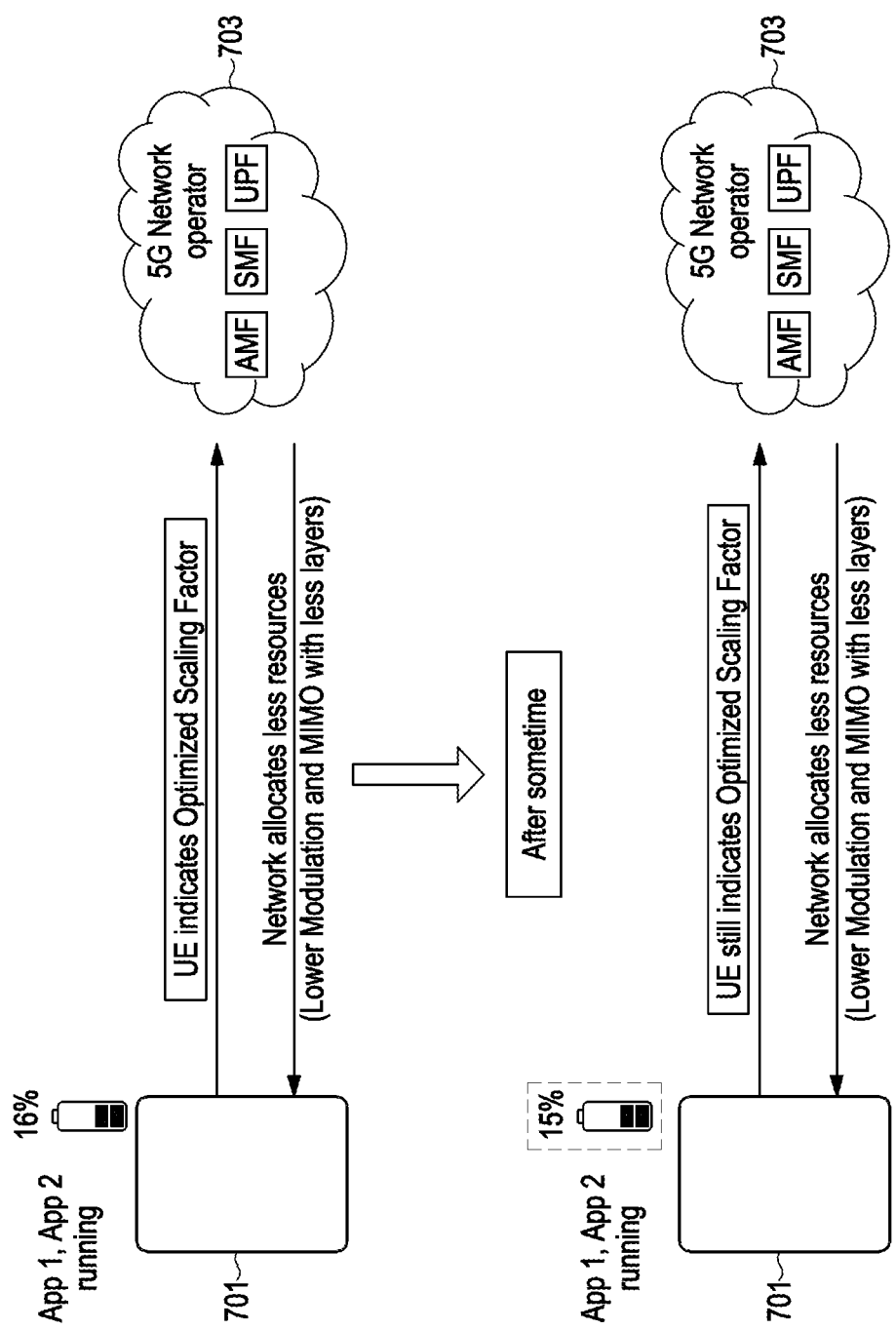
FIG. 7 is a diagram illustrating an example environment for power management by a user equipment (UE), in accordance with various embodiments.

FIG. 7 is a diagram illustrating an environment for power management by a user equipment (UE), in accordance with various embodiments. As shown in FIG. 7, the UE 701 is in a crunch situation (such as UE's battery is low). Some Apps, e.g., Apps 1, Apps 2 are running on the UE. According to various embodiments of the present disclosure, the UE computes and reports an optimized scaling factor, even if the maximum UE capability is available. The network 703 allocates less resources (such as lower modulation and MIMO with less layers) based on UE-reported optimized scaling factor. The 5G network may comprise of access and mobility management function (AMF), session management function (SMF), user plane function (UPF). The 5G network may comprise more or less components than shown in FIG. 1. After some time, due to lower Tx Power/resource utilization for lower modulation/MIMO with less layers, battery consumption would be less, and the UE would be able to sustain battery for a longer period of time. The example is further explained in greater detail below with reference to FIG. 8.

Figure 8:
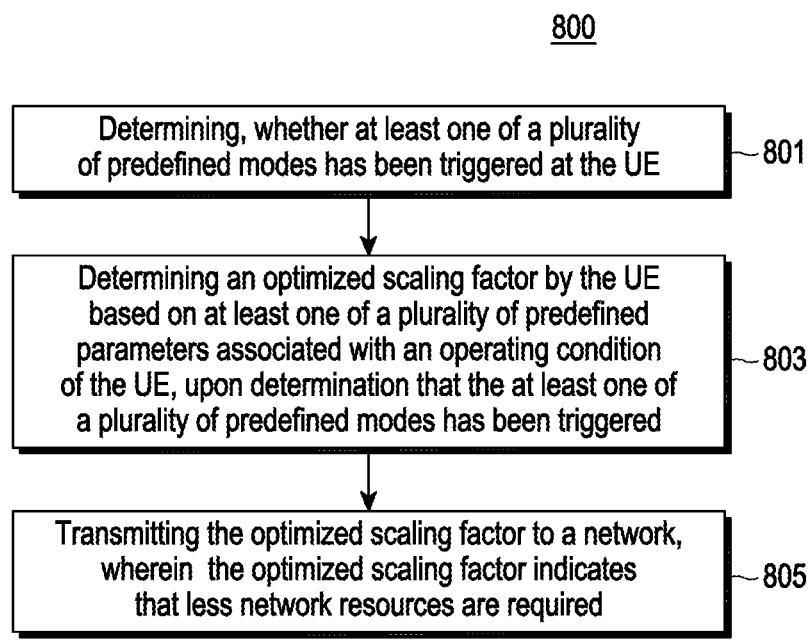
FIG. 8 is a flowchart illustrating an example method for power management by a user equipment (UE), in accordance with various embodiments.

FIG. 8 is a flowchart illustrating an example method 800 for power management by a user equipment (UE), in accordance with various embodiments. It should be noted that the method as illustrated in FIG. 8 may be performed by the UE. At operation 801, the method 800, may comprise determining, whether at least one of a plurality of predefined (e.g., specified) modes has been triggered at the UE. In an embodiment, the plurality of predefined modes may include, for example, and without limitation, an emergency mode, a disaster roaming mode, a power saving mode, a low battery mode, a thermal throttling mode, a hotspot power saving mode, a driving mode, a restricted data usage mode, a restricted background data usage mode, a display off mode, etc.

At 803, the method 800 may comprise determining an optimized scaling factor by the UE based on at least one of a plurality of predefined (e.g., specified) parameters associated with an operating condition of the UE, upon determination that the at least one of a plurality of predefined modes has been triggered. In an embodiment, the plurality of predefined parameters include, for example, and without limitation, battery usage pattern, current battery level, network signal condition, channel quality, change in temperature in the UE, usage pattern of application on the UE, a number of applications running on the UE, amount of traffic, traffic usage pattern, UE usage status, user input, etc. For example, in a weak signal condition or poor channel quality, higher modulation/MIMO will not be used so it is better to use scaling factor other than 1 to reduce modulation order/MIMO which will be best suited at that time and save power as well in the process. Similarly, while checking app usage pattern or number of app open in foreground & background, the UE may decide if scaling factor can be optimized. Regarding traffic pattern, be it normal data traffic or hotspot data traffic, the UE can analyze it to determine optimized scaling factor to be used. Further, based on user preference determined using different setting menu like power saving mode or power saving hotspot mode or adaptive battery mode or adaptive power saving mode, the UE can decide best scaling factor to utilize to fulfil user need. It should be noted that the above described predefined parameters are just a few examples of the predefined parameters and any other parameter which may be used to decide the scaling factor may be a part of the predefined parameters.

For example, if the predefined mode is the emergency mode or the disaster mode, the UE may determine the optimized scaling factor as 0.4 to save maximum power and if the user initiates some services which require more resources (like streaming, downloading) then the UE may determine the optimized scaling factor as 0.75/0.8 to fulfill user requirement without affecting any service.

For example, if the predefined mode is the power saving mode, the UE may determine the optimized scaling factor as 0.4 for maximum power saving mode & 0.75/0.8 for optimized mode to save power.

For example, for low battery mode, the UE may determine the optimized scaling factor based on remaining battery percentage e.g., if battery power is too low such as 10%, then the optimized scaling factor may be determined as 0.4. However, if the battery power is moderate such as 40%, then the optimized scaling factor may be determined as 0.75/0.8. Hence, the scaling factor may be optimized without affecting user service.

For example, if the predefined mode is the thermal throttling mode, the UE may determine the optimized scaling factor as 0.4, when the UE is heated beyond a predefined threshold to reduce data consumption, which may save power and help the UE to cool down. It should be noted that the predefined threshold may be configurable and may be configured by the UE.

In the hotspot power saving mode, the UE may analyze hotspot traffic and based on this traffic, the UE may determine which scaling factor for example 0.4/0.75/0.8 is best suited for UE at that time to save more power without affecting hotspot user service.

If the UE is in a roaming scenario, the UE may determine the optimized scaling factor to avoid high data usage (and subsequently high billing charges) and get minimal required services for data connectivity.

If the UE is in restricted data usage mode, e.g., the data usage is set to a lower limit, the UE can determine if the data usage is about to reach the limit. If yes, then the UE may determine the optimized scaling factor to avoid high data usage and data disconnection. Moreover, the UE can intelligently determine (using artificial intelligence (AI)/machine learning (ML) mechanisms) regarding the data speed requirements of various applications and may determine the optimized scaling factor to avoid high data usage and save power/data usage.

If the predefined mode is the display off mode and some data activity is going on in background (apart from Hotspot), then the UE may determine the optimized scaling factor to avoid high Data usage and save power. Moreover, whenever any data is ongoing in the background, which is not critical, then the UE may determine the optimized scaling factor to avoid high data usage and save power.

It should be noted that the above are only few examples of the optimized scaling factor corresponding to the predefined mode. It should be noted that any other available scaling factor may be determined by the UE that may depend on the predefined mode as well as the one or more of the plurality of predefined parameters.

Further, it should be noted that the UE may determine the optimized scaling factor using a learning model using past usage of the optimized scaling factor.

After determining the optimized scaling factor, at 805, the method 800 may comprise transmitting the optimized scaling factor to a network, wherein the optimized scaling factor indicates that less network resources are required. In an embodiment, the optimized scaling factor may be transmitted to a network through a signalling message such as when indicating "UE capability" to the network. In particular, the UE may transmit the scaling factor in a "UECappabilityInfo msg" after a tracking area update (TAU) request is accepted by the network. It should be noted that the UE may transmit the scaling factor in any other signalling message.

However, if at 801, it is determined that the at least one of a plurality of predefined modes has not been triggered at the UE, then a default scaling factor to the network is transmitted in the signalling message. In an embodiment, the default scaling factor may be transmitted in the same manner as the optimized scaling factor.

In an embodiment, the optimized scaling factor is less than 1, whereas the default scaling factor is 1.

The UE may receive, from the network, a first set of network resources in response to transmitting the optimized scaling factor. For example, the UE may receive first/reduced set of network resources such as No/lower MIMO, lower modulation etc. from the network and may operate with the received first set of network resources. However, if the default scaling factor is transmitted, then the UE may receive, from the network, a second set of network resources in response to transmitting the default scaling factor. For example, the UE may receive the second set of network resources such as higher modulation schemes or higher MIMO with more layers etc. from the network and may operate with the received second set of network resources. Hence, it can be noted that the first set of network resources are less than the second set of network resources.

In an embodiment, the UE may reduce a maximum throughput (TPUT) capacity of the UE based on the optimized scaling factor. For example, if the optimized scaling factor is 0.8, then the maximum TPUT may be reduced by 20%. If the optimized scaling factor is 0.4, then the maximum TPUT may be reduced by 60%. However, if the optimized scaling factor is 0.75, then the maximum TPUT may be reduced by 25%.

Figure 9:
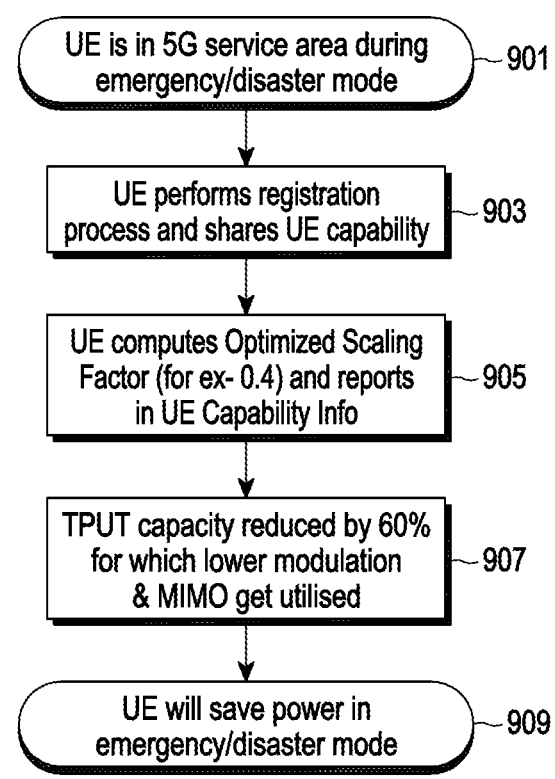
FIG. 9 is a flowchart illustrating an example method for power management by a user equipment (UE) in a disaster and/or emergency mode, in accordance with various embodiments.

FIG. 9 is a flowchart illustrating an example method for power management by a user equipment (UE) in a disaster and/or emergency mode, in accordance with various embodiments. As shown in FIG. 9, at 901, the UE is in 5G service area and is trying to register on a network during an emergency and/or disaster mode. At 903, the UE performs registration process on suitable cell and shares UE capability. In the emergency and/or disaster mode, first priority is service continuity for essential services which do not require high data speed and can be managed with comparatively less resources. In such modes, during registration process, at 905, UE may compute optimized scaling factor and report "scalingFactor" in an IE such as 0.4 (or 0.75 or 0.8) instead of 1. As a result, at 907, the max TPUT capacity of the UE decreases by ~60% (or 25% or 20%). As a result of this lower TPUT capacity, the UE uses no/lower MIMO along with lower modulation which saves power consumption of the UE, as shown at 909. Also, the network may assign less resources to the UE and the remaining resources may be available for other users which is more important in the emergency and/or disaster mode where priority is to provide service to maximum number of users instead of providing best service to just one/few of the users. Hence, the user experience will not get affected and user will have long battery life experience which is a critical advantage during emergency/disaster situations.

Figure 10:
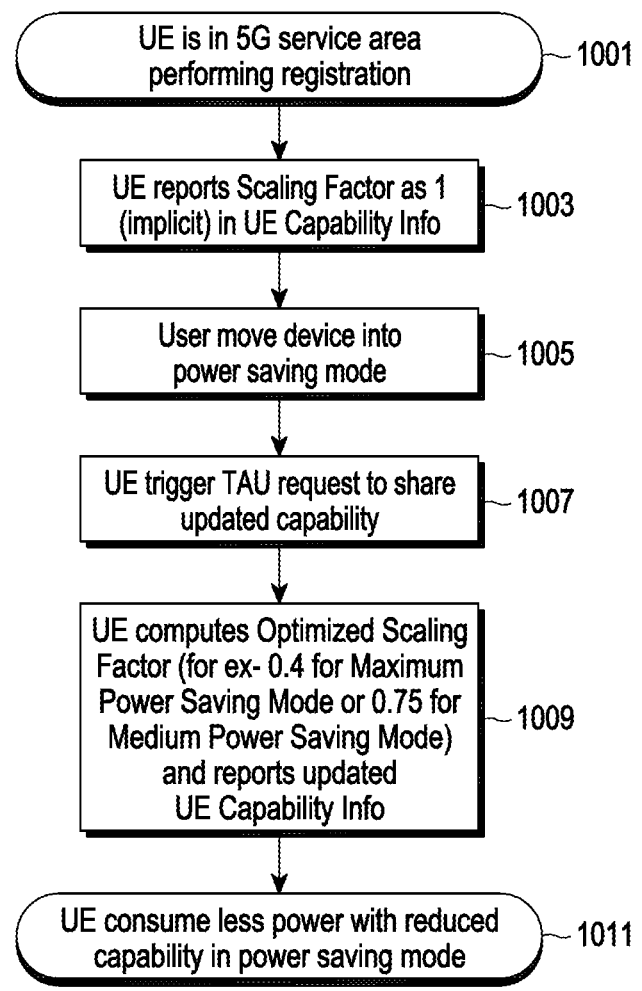
FIG. 10 is a flowchart illustrating an example method for power management by a user equipment (UE) in a power saving mode, in accordance with various embodiments.

FIG. 10 is a flowchart illustrating an example method for power management by a user equipment (UE) in a power saving mode, in accordance with various embodiments. As shown in FIG. 10, at 1001, the UE is in 5G service area and is trying to register on a network. At 1003, the UE performs registration process on suitable cell and shares UE capability with scaling factor as '1'. At 1005, the user of the UE moves to power saving mode. At 1007, the UE triggers TAU request with the network including "UE radio capability information update needed" in an IE to inform network that UE capability needs to be updated for the UE. Following TAU accept and complete message, the network may request to receive UE capability from the UE. Based on user's selection of the power saving mode, at 1009, the UE may compute optimized scaling factor and report to network in UeCapabilityInformation message. For example, if the user selects maximum power saving mode, the UE may determine optimized scaling factor as 0.4 instead of 1. As a result, Max TPUT capacity of the UE may decrease by 60%. Similarly, if the user has opted for medium power saving mode, the UE may determine the optimized scaling factor as 0.75 (or 0.8) instead of 1. As a result, Max TPUT capacity of the UE may decrease by 25% (or 20%). As a result of this lower TPUT capacity, the UE may use No/lower MIMO along with lower modulation which saves power consumption of the UE, as shown at step 1011. Hence, the user experience will not get affected and user will have long battery life experience.

Figure 11:
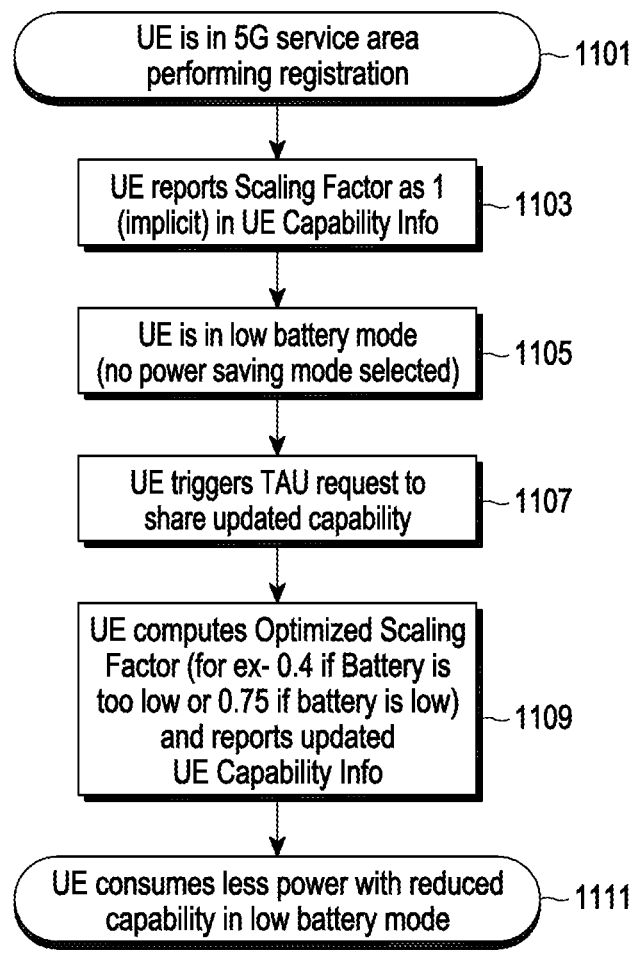
FIG. 11 is a flowchart illustrating an example method for power management by a user equipment (UE) in a low battery mode, in accordance with various embodiments.

FIG. 11 is a flowchart illustrating an example method for power management by a user equipment (UE) in a low battery mode, in accordance with various embodiments. As shown in FIG. 11, at 1101, the UE is in 5G service area and is trying to register on a network. At 1103, the UE performs registration process on suitable cell and shares UE capability with scaling factor as '1'. The UE is in low battery mode and not in power saving mode. Accordingly, at 1105, the UE detects the low battery mode. At 1107, the UE triggers TAU request with network including "UE radio capability information update needed" in an IE to inform the network that the UE capability needs to be updated for the UE. Following TAU accept and complete message, the network requests to receive UE capability from the UE. At 1109, the UE may compute optimized scaling factor and report to network in UeCapabilityInformation message. For example, the UE may determine optimized scaling factor as 0.4 (or 0.75 or 0.8) instead of 1. As a result, the max TPUT capacity of the UE may decrease by 60% (or 25% or 20%). As a result of this lower TPUT capacity, UE may use No/lower MIMO along with lower modulation which saves power consumption of the UE, as shown at step 1111. This way, the UE can save power smartly without user intervention. Hence, the user experience will not get affected and user will have long battery life experience.

Figure 12:
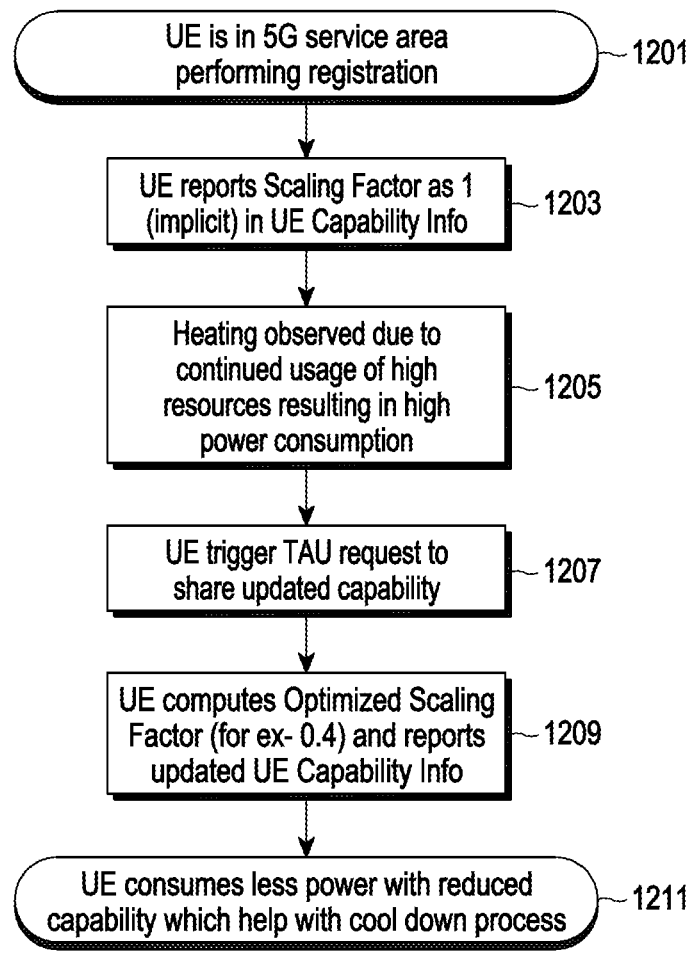
FIG. 12 is a flowchart illustrating an example method for power management by a user equipment (UE) in a thermal throttling mode, in accordance with various embodiments.

FIG. 12 is a flowchart illustrating an example method for power management by a user equipment (UE) in a thermal throttling mode, in accordance with various embodiments. As shown in FIG. 12, at 1201, the UE is in 5G service area and is trying to register on a network. At 1203, the UE performs registration process on suitable cell and shares UE capability with scaling factor as '1'. Due to high data activity services/other reasons, the UE gets heated due to continued usage of high resources resulting in high power consumption and enters the thermal throttling mode. Accordingly, at 1205, the UE detects the thermal throttling mode. In such cases, only option the UE has is to release 5G cell e.g., to discontinue service or keep the UE idle for some time which affects user experience. However, in an embodiment of the present disclosure, at 1207, the UE triggers TAU request with network including "UE radio capability information update needed" in an IE to inform the network that the UE capability needs to be updated for the UE. Following TAU accept and complete message, the network requests to receive the UE capability from the UE. At 1209, the UE may compute optimized scaling factor and report to network in UeCapabilityInformation message. For example, the UE may determine optimized scaling factor as 0.4 (or 0.75 or 0.8) instead of 1. As a result, Max TPUT capacity of the UE may decrease by 60% (or 25% or 20%). As a result of this lower TPUT capacity, the UE may use No/lower MIMO along with lower modulation which saves power consumption of the UE, as shown at step 1211. This way, the UE can save power smartly without user intervention. Hence, the user experience will not get affected and user will have long battery life experience.

Figure 13:
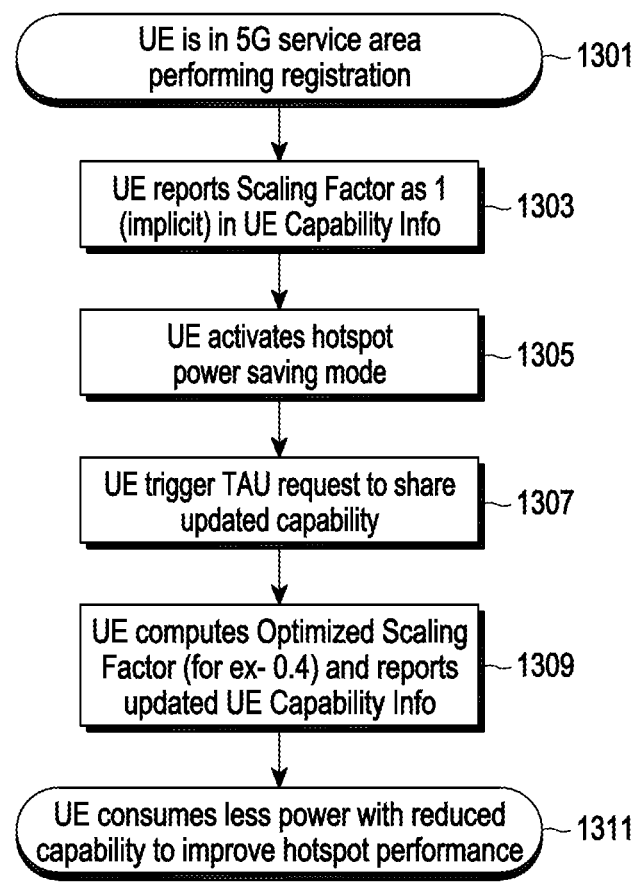
FIG. 13 is a flowchart illustrating an example method for power management by a user equipment (UE) in a hotspot power saving mode, in accordance with various embodiments.

FIG. 13 is a flowchart illustrating an example method for power management by a user equipment (UE) in a hotspot power saving mode, in accordance with various embodiments. As shown in FIG. 13, at 1301, the UE is in 5G service area and is trying to register on a network. At 1303, the UE performs registration process on suitable cell and shares UE capability with scaling factor as '1'. UE is primary hotspot device and secondary devices are connected to hotspot but not using any high speed data services/when hotspot keeps utilising more power unnecessarily. However, the UE would want to reduce power consumption. Accordingly, at 1305, the UE activates hotspot power saving mode. The hotspot power saving mode tries to reduce battery usage (e.g., by intermittently going to sleep when display is off and waking up when display is on, if the relevant option is selected by the user). At 1307, based on user's selection of hotspot power saving mode, the UE triggers TAU request with network including "UE radio capability information update needed" in an IE to inform network that UE capability needs to be updated for the UE. Following TAU accept and complete message, the network requests to receive the UE capability from the UE. At 1309, the UE may compute optimized scaling factor and report to network in UeCapabilityInformation message. For example, the UE may determine optimized scaling factor as 0.4 (or 0.75 or 0.8) instead of 1. As a result, Max TPUT capacity of the UE may decrease by 60% (or 25% or 20%). As a result of this lower TPUT capacity, UE may use No/lower MIMO along with lower modulation which saves power consumption of the UE, as shown at step 1311. This way, the UE can save power smartly without user intervention. Hence, the user experience will not get affected and user will have long battery life experience.

In an embodiment, the various example embodiments of the disclosure may also be used to Reduce/Optimize UE Capability based on Mobility/UE Speed or UE modes like S-Bike/Car Mode using optimized scaling factor. For example, in case if the network rejects the UE with cause as load balancing (congestion control) usually when it is not able to provide requested resources to UE, the UE may determine and transmit the optimized scaling factor to make sure network service is available to avoid another rejection.

Further, in an embodiment, the optimized scaling factor is used only after the consent of the user. The consent can be taken as a one-time consent from user (using any setting options or user menu or button) or can be taken every time as a Notification or toast/Pop-up message on the User Interface (UI) asking consent from the user to transmit the reduced/optimized capability using the optimized scaling factor.

Figure 14:
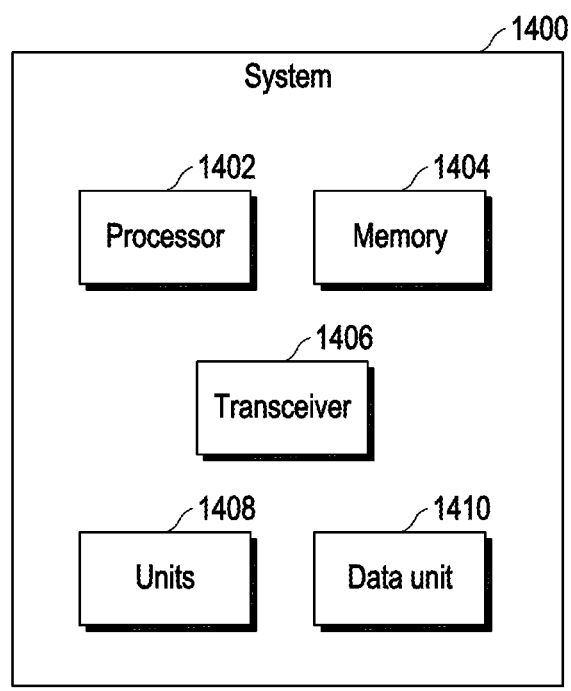
FIG. 14 is a block diagram illustrating an example configuration of a system for power management by a user equipment (UE), in accordance with various embodiments.

FIG. 14 is a block diagram illustrating an example configuration of a system for power management by a user equipment (UE), in accordance with various embodiments. It should be noted that the system 1400 may be a part of a UE. In an embodiment, the system 1400 may be connected to the UE. The system 1400 may include, but is not limited to, a processor (e.g., including processing circuitry) 1402, a memory 1404, a transceiver 1406, units 1408, and data unit 1410. The units 1408 and the memory 1404 may be coupled to the processor 1402. The system 1400 may be configured to perform methods as discussed in reference to FIGS. 7-13. The transceiver 1406 may be configured to transmit the optimized and/or default scaling factor and receive the first and/or second set of network resources.

The processor 1402 may be a single processing unit or several units, all of which could include multiple computing units. The processor 1402 may be implemented as one or more microprocessors, microcomputers, microcontrollers, digital signal processors, central processing units, state machines, logic circuitries, and/or any UEs that manipulate signals based on operational instructions. Among other capabilities, the processors 1402 are configured to fetch and execute computer-readable instructions and data stored in the memory 1404, respectively.

The memory 1404 may include any non-transitory computer-readable medium known in the art including, for example, volatile memory, such as static random access memory (SRAM) and dynamic random access memory (DRAM), and/or non-volatile memory, such as read-only memory (ROM), erasable programmable ROM, flash memories, hard disks, optical disks, and magnetic tapes. The memory may store instructions which when executed by a processor (1402), causes the UE to perform operations of the UE described herein.

The units 1408 amongst other things, include routines, programs, objects, components, data structures, etc., which perform particular tasks or implement data types. The units 1408 may also be implemented as, signal processor(s), state machine(s), logic circuitries, and/or any other UE or component that manipulate signals based on operational instructions. For example, and without limitation, the units may include various processing circuitry and/or executable program instructions.

Further, the units 1408 can be implemented in hardware, instructions executed by a processing unit, or by a combination thereof. The processing unit can comprise a computer, a processor, such as the processor 1402, a state machine, a logic array, or any other suitable UEs capable of processing instructions. The processing unit can be a general-purpose processor which executes instructions to cause the general-purpose processor to perform the required tasks or, the processing unit can be dedicated to performing the required functions. In an embodiment of the present disclosure, the units 1408 may be machine-readable instructions (software) which, when executed by a processor/processing unit, perform any of the described functionalities.

The data unit 1410 serves, amongst other things, as a repository for storing data processed, received, and generated by one or more of the units 1408, respectively.

Accordingly, the present disclosure provides following example advantages:
saving power consumption in crunch scenarios to improve battery performance
save resources assigned based on optimized scaling factor and reassign those resources to other User for enhanced experience and better Network load balancing and better resource utilization
providing access to necessary service connectivity without interruption and appreciating long battery life.

Unless otherwise defined, all technical and scientific terms used herein have the same meaning as commonly understood by one of ordinary skilled in the art to which the disclosure belongs. The system, methods, and examples provided herein are illustrative only and not intended to be limiting.

Benefits, other advantages, and approaches to addressing problems have been described above with regard to various example embodiments. However, the benefits, advantages, approaches to addressing problems, and any component(s) that may cause any benefit, advantage, or approach to occur or become more pronounced are not to be construed as a critical, required, or essential feature or component of any or all the claims.

While the disclosure has been illustrated and describe with reference to various example embodiments, it will be understood that the various example embodiments are intended to be illustrative, not limiting. As would be apparent to a person in the art, various working modifications may be made to the method in order to implement the disclosure as taught herein. The drawings and the foregoing description give examples of embodiments. Those skilled in the art will appreciate that one or more of the described elements may well be combined into a single functional element. Alternatively, certain elements may be split into multiple functional elements. Elements from one embodiment may be added to an embodiment. It will also be understood that any of the embodiment(s) described herein may be used in conjunction with any other embodiment(s) described herein.

What is claimed is:

1. A method for power management by a user equipment (UE), comprising:
   determining, whether at least one of a plurality of modes has been triggered at the UE;
   determining an optimized scaling factor based on at least one of a plurality of parameters associated with an operating condition of the UE, and a learning model using past usage of the optimized scaling factor by the UE, upon determining that the at least one of the plurality of modes has been triggered; and
   transmitting the optimized scaling factor to a network, wherein the optimized scaling factor indicates that less network resources are required.

2. The method of claim 1, wherein the plurality of modes includes at least one of an emergency mode, a disaster roaming mode, a power saving mode, a low battery mode, a thermal throttling mode, a hotspot power saving mode, a driving mode, a restricted data usage mode, a restricted background data usage mode, and a display off mode.

3. The method of claim 1, wherein the plurality of parameters include at least one of battery usage pattern, current battery level, network signal condition, channel quality, change in temperature in the UE, usage pattern of application on the UE, a number of applications running on the UE, amount of traffic, traffic usage pattern, UE usage status, and user input.

4. The method of claim 1, further comprising:
   receiving, from the network, a first set of network resources in response to transmitting the optimized scaling factor; and
   operating with the first set of network resources.

5. The method of claim 1, further comprising:
   reducing a maximum throughput (TPUT) capacity of the UE based on the optimized scaling factor.

6. The method of claim 1, further comprising:
   transmitting a default scaling factor through a signaling message to the network in response to the determining that the at least one of a plurality of specified modes has not been triggered at the UE;
   receiving a second set of network resources in response to transmitting the default scaling factor; and
   operating with the second set of network resources, wherein the default scaling factor is 1.

7. The method of claim 6, wherein the first set of network resources are less than the second set of network resources.

8. The method of claim 1, wherein the optimized scaling factor is less than 1.

9. The method of claim 1, wherein transmitting the optimized scaling factor comprises:
   transmitting the optimized scaling factor to the network through a signalling message.

10. A user equipment (UE) for power management, comprising:
    memory storing instructions; and
    a processor comprising processing circuitry coupled to the memory, wherein the instructions, when executed individually and/or collectively by the processor, cause the UE to:
      determine, whether at least one of a plurality of modes has been triggered at the UE;
      determine an optimized scaling factor based on at least one of a plurality of parameters associated with an operating condition of the UE, and a learning model using past usage of the optimized scaling factor by the UE, upon determining that the at least one of the plurality of modes has been triggered; and
      transmit the optimized scaling factor to a network, wherein the optimized scaling factor indicates that less network resources are required.

11. The UE of claim 10, wherein the plurality of modes includes at least one of an emergency mode, a disaster roaming mode, a power saving mode, a low battery mode, a thermal throttling mode, a hotspot power saving mode, a driving mode, a restricted data usage mode, a restricted background data usage mode, and a display off mode.

12. The UE of claim 10, wherein the plurality of parameters include at least one of battery usage pattern, current battery level, network signal condition, channel quality, change in temperature in the UE, usage pattern of application on the UE, a number of applications running on the UE, amount of traffic, traffic usage pattern, UE usage status, and user input.

13. The UE of claim 10, wherein the instructions, when executed individually and/or collectively by the processor, cause the UE further to:
    receive, from the network, a first set of network resources in response to transmitting the optimized scaling factor; and
    operate with the first set of network resources.

14. The UE of claim 10, wherein the instructions, when executed individually and/or collectively by the processor, cause the UE further to:
    reduce a maximum throughput (TPUT) capacity of the UE based on the optimized scaling factor.

15. The UE of claim 10, wherein the instructions, when executed individually and/or collectively by the processor, cause the UE further to:
    transmit a default scaling factor through a signaling message to the network in response to the determination that the at least one of the plurality of modes has not been triggered at the UE;
    receive a second set of network resources in response to transmitting the default scaling factor; and
    operate with the second set of network resources, wherein the default scaling factor is 1.

16. The UE of claim 15, wherein the first set of network resources are less than the second set of network resources.

17. The UE of claim 10, wherein the optimized scaling factor is less than 1.

18. A non-transitory computer-readable storage medium storing instructions which, when executed individually and/or collectively by a processor of a user equipment (UE) cause the UE to perform operations, the operations comprising:
- determining whether at least one of a plurality of modes has been triggered at the UE;
- determining an optimized scaling factor based on at least one of a plurality of parameters associated with an operating condition of the UE, and a learning model using past usage of the optimized scaling factor by the UE, upon determining that the at least one of the plurality of modes has been triggered; and
- transmitting the optimized scaling factor to a network, wherein the optimized scaling factor indicates that less network resources are required.

* * * * *